United States Patent [19]

Sung

[11] Patent Number: 5,236,076
[45] Date of Patent: Aug. 17, 1993

[54] APPARATUS FOR AUTOMATICALLY UNLOADING DEVICE IN HANDLER

[75] Inventor: Yong G. Sung, Kumi, Rep. of Korea

[73] Assignee: Gold Star Electron Co., Ltd., Rep. of Korea

[21] Appl. No.: 941,567

[22] Filed: Sep. 8, 1992

[30] Foreign Application Priority Data

Sep. 13, 1991 [KR] Rep. of Korea ............... 14935/1991

[51] Int. Cl.⁵ ............................................. B65G 47/10
[52] U.S. Cl. .................................. 198/368; 198/419.1; 198/531; 53/250; 414/404
[58] Field of Search ...................... 198/360, 368, 419.1, 198/431, 531; 53/250, 251, 313, 315, 566; 414/403, 404, 416; 221/131, 273, 286, 289

[56] References Cited

U.S. PATENT DOCUMENTS

| | | | |
|---|---|---|---|
| 3,239,054 | 3/1966 | Eliassen | 198/531 X |
| 4,492,070 | 1/1985 | Marse et al. | 53/566 X |
| 4,660,710 | 4/1987 | Swapp et al. | 414/403 X |
| 4,717,012 | 1/1988 | Swapp et al. | 198/419.1 |

FOREIGN PATENT DOCUMENTS 0899440  1/1982  U.S.S.R. .............................. 198/368

Primary Examiner—Joseph E. Valenza
Assistant Examiner—Tuan N. Nguyen
Attorney, Agent, or Firm—Poms, Smith, Lande & Rose

[57] ABSTRACT

An apparatus for automatically unloading devices in handler which fills empty sleeves with devices tested from a tester and unloads the sleeves according to characteristics of the devices, and which can selectively actuate a plurality of stopper pins by only one output signal without a plurality of solenoids. The apparatus comprises a multitray having a plurality of tracks which is positioned above a guide shaft of the handler, a plurality of followers, each having a stopper pin for blocking and releasing devices on the tracks, which are mounted on the corresponding tracks respectively, an arm mounted on a slide block slidably mounted on the guide shaft which comes into contact with one of the followers selectively, and an operating plate for raising and lowering the arm and one of the followers by actuation of a cylinder.

4 Claims, 3 Drawing Sheets

APPARATUS FOR AUTOMATICALLY UNLOADING DEVICE IN HANDLER

BACKGROUND OF THE INVENTION

1. Field of the Invention

The present invention relates to an apparatus for automatically unloading device in handler, and more particularly to an apparatus for automatically unloading device in handler which fills empty sleeves with devices, such as IC chips, sorted by a tester of an apparatus for loading and unloading sleeves for an integrated circuit tester and unloads the sleeves filled with devices according to characteristics of devices.

2. Description of the Prior Art

Generally, a handler for testing and sorting devices produced by a progress of work comprises a loader section for sequentially loading sleeves filled with devices, a conveyer section for sequentially conveying the sleeves loaded on the loader section, a supplying section for supplying the devices in the sleeves positioned on the conveying section, a head section for reversing the devices supplied from the supplying section, a tester section for testing quality of the devices, a sorter section for sorting the devices tested by the tester section, and an unloader section for unloading the devices sorted by the sorter section.

Such kind of handler is in detailed disclosed in U.S. patent Ser. No. 07/866,275 Apr. 13, 1992 by the present applicator. Therefore, there is no need to describe a whole handler and thus only an unloader for devices related to the present invention will be described hereinafter.

FIGS. 1 and 2 illustrate a known an apparatus for unloading device in handler. In the apparatus shown in FIGS. 1 and 2, a multitray 23 for unloading tested devices 22 is fixedly mounted on an installing plate 21. The multitray 23 is provided thereon with solenoids 25 each having a stopper pin 24 exposed to a corresponding track, the number of the solenoids 25 being equal to that of the tracks. A sliding block 27 is slidably mounted on a pair of guide shafts 28 under the solenoids 25 to transfer empty sleeves 26 to the multitray 23 and unload sleeves filled with devices.

Operation of the apparatus for unloading device in handler mentioned above will be now described.

Upon actuating a cylinder 29 mounted on the sliding block 27, a sleeve clamp 30 mounted on the sliding block 27 grips empty sleeve 26 and is moved to the multitray 23 along the guide shafts 28 by actuation of the cylinder 29. Thereafter, when the sleeve clamp 30 arrives at one of the tracks on which a certain number of devices 22 are loaded, the solenoid 25 is actuated by a separate sensor.

Therefore, the stopper pin 24 fixed to the solenoid 25 blocking the devices 22 loaded on the multitray 23 rises against a compression spring 31 by actuation of the solenoid 25. After the stopper pin 24 has been raised, the devices 22 on the multitray 23 are inserted into the empty sleeve 26 due to their own weights because the apparatus for unloading devices is inclined at a certain angle with respect to a horizontal plane.

After the empty sleeve 26 has been filled with the devices 22, the sliding block 27 is moved to a storage box (not shown) and then the sleeve clamp 30 mounted on the sliding block 27 releases the sleeve 26 filled with the devices 22, thereby allowing the sleeve 26 to fall into the storage box. Thereafter, the operation described above is carried out repeatedly.

However, the above-mentioned known apparatus for unloading device requires output signals in the same number as that of tracks mounted on the multitray 23 in order to control the solenoids 25 each having the stopper pin 24.

In addition, since there must be used a plurality of expensive solenoids 25 with accordance to the number of the tracks of the multitray 23, a manufacturing cost is increased.

SUMMARY OF THE INVENTION

Therefore, the present invention has been made in view of the above-described prior art problems and an object of the invention is to provide an apparatus for unloading devices in handler which can actuate a plurality of stopper pins by only one output signal without a plurality of solenoids.

In accordance with the present invention, the object mentioned above can be accomplished by providing an apparatus for automatically unloading devices in handler which fills empty sleeves with tested devices and unloads the sleeves, said apparatus comprising: a multitray having a plurality of tracks which is positioned above a guide shaft of the handler; a plurality of followers, each having a stopper pin for blocking and releasing devices on the tracks, which are mounted on the corresponding tracks respectively; an arm mounted on a slide block slidably mounted on the guide shaft which comes into contact with one of the followers selectively; and an operating plate for raising and lowering the arm and one of the followers by actuation of a cylinder.

BRIEF DESCRIPTION OF THE DRAWINGS

These and other objects, features and advantages of the invention will become more apparent upon a reading of the following detailed specification and drawings, in which.

DETAILED DESCRIPTION OF THE PREFERRED EMBODIMENTS

An apparatus for unloading devices in handler according to an embodiment of the present invention will now be described by referring to FIGS. 3 to 6 in the accompanying drawings.

Figure 1:
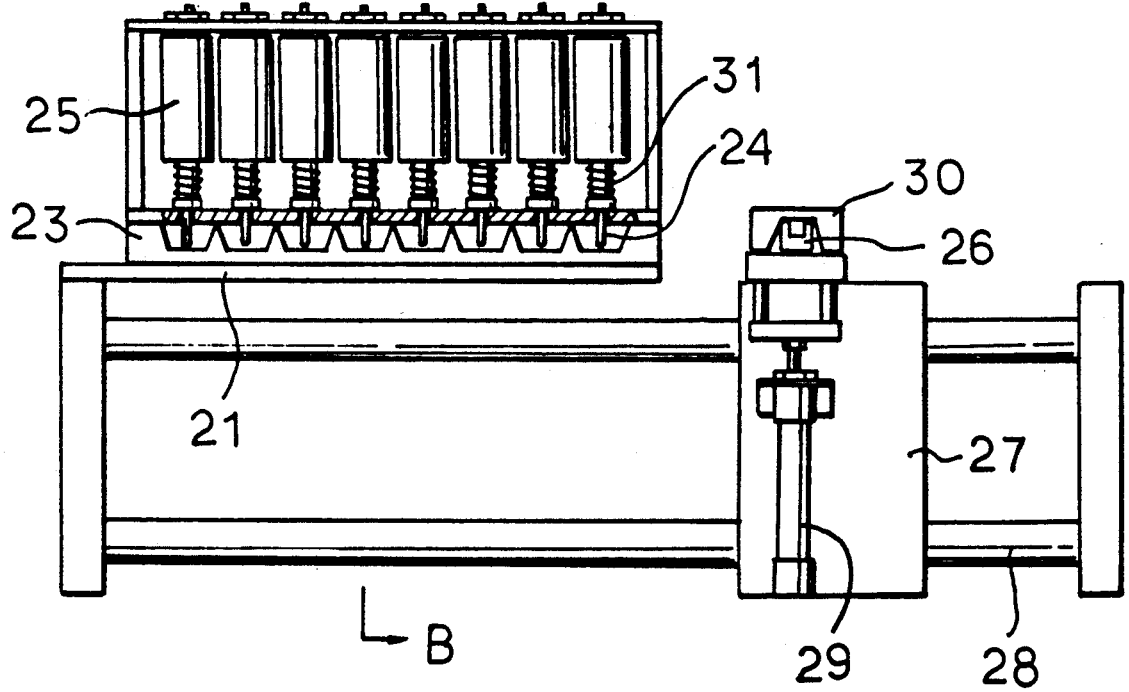
FIG. 1 is a schematic elevational view showing a known apparatus for unloading devices in handler.
Figure 2:
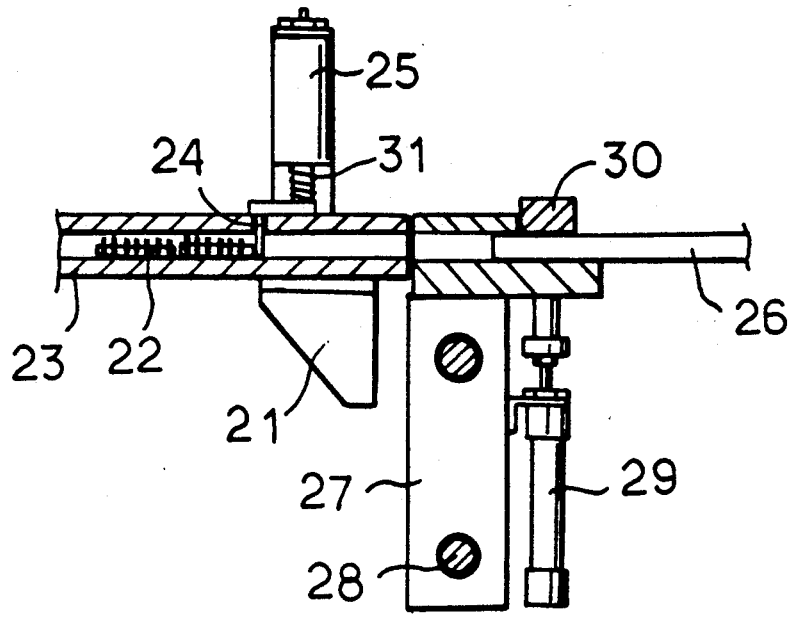
FIG. 2 is a sectional view taken on line B—B of FIG. 1.
Figure 3:
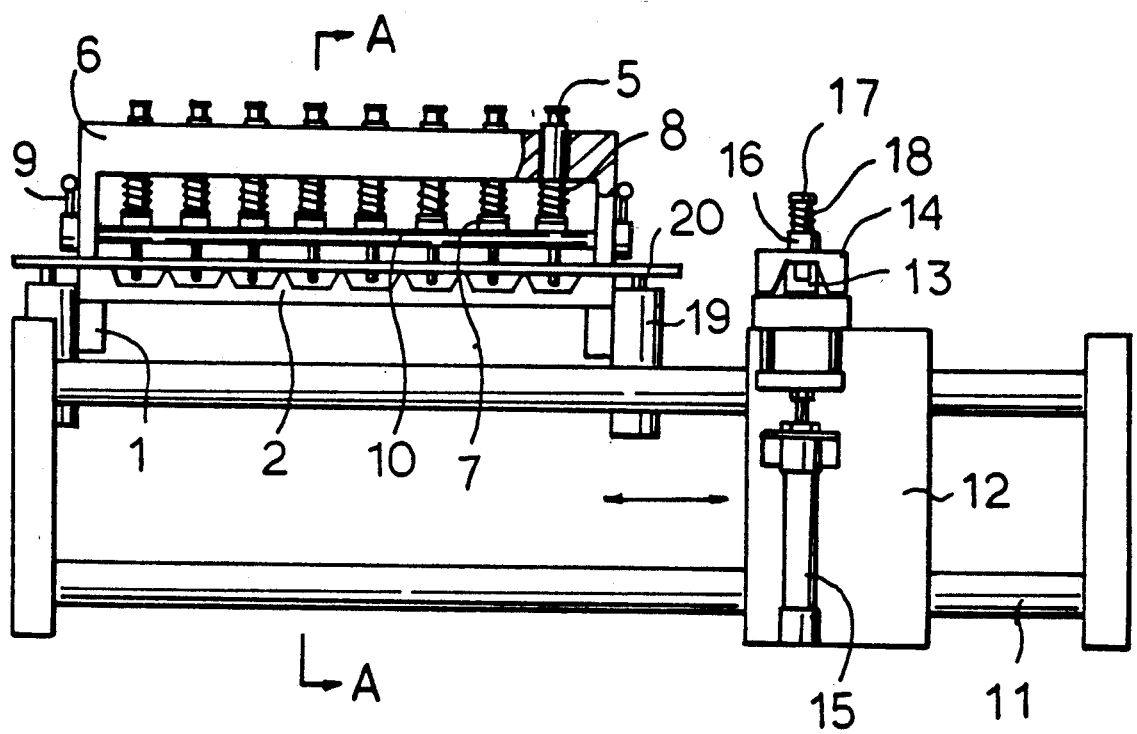
FIG. 3 is a schematic elevational view showing an apparatus for unloading devices in handler according to the present invention.
Figure 4:
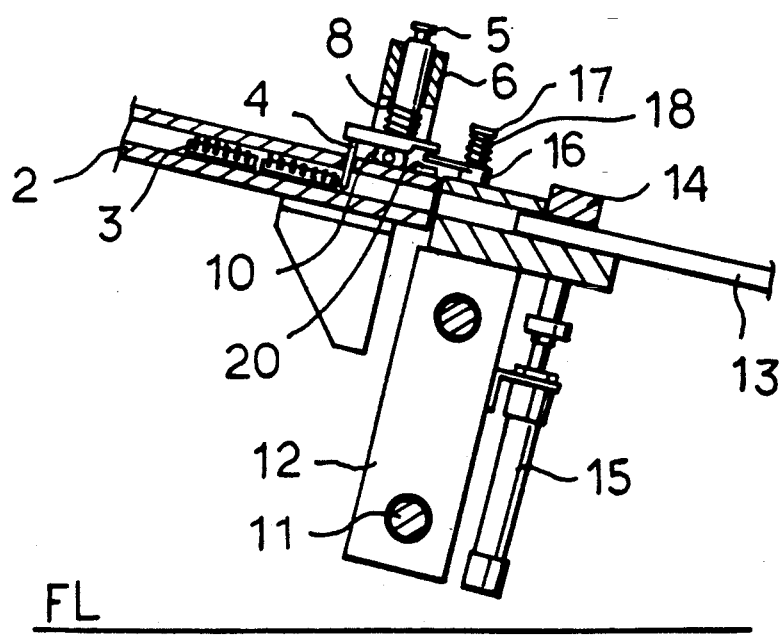
FIG. 4 is a sectional view taken on line A—A of FIG. 3.

FIG. 3 illustrates an apparatus for unloading devices in handler according to the invention and FIG. 4 is a sectional view taken on line A—A of FIG. 3. As shown in FIG. 4, the apparatus for unloading devices in handler according to invention is inclined with respect to a horizontal ground surface at a certain angle.

A multitray 2 mounted on an installing plate 1 is provided thereon with a plurality of tracks for guiding movement of devices 3. A plurality of stopper pins are provided on the tracks such that the stopper pins is exposed to the tracks to block and release the devices 3.

Each of the stopper pins 4 is fixed to a corresponding lower surface of follower 7 fixed to a sliding pin 5. The sliding pin 5 is slidably mounted in a bush housing 6. A compression spring 8 is inserted on the sliding pin 5 between the bush housing 6 and the follower 7. A cam is disposed between the multitray 2 and the follower 7 and is connected to a lever 9 to be actuated by the lever 9.

Upon pulling the lever 9, the cam 10 connected to the lever 9 is also rotated to raise the cam follower 7 engaged therewith. Accordingly, the plurality of stopper pins 4 fixed to the cam follower 7 are raised simutaneously, thereby allowing all devices 3 resting on the multitray 2 to be unloaded. At this case, the cam 10 may be formed with opposite cut surfaces or an elliptic surface at the outer circumference.

A sliding block 12 is mounted on a pair of guide shafts under the multitray 2 to slide along the guide shafts. A sleeve clamp 14 for gripping an empty sleeve 13 is connected to a cylinder 15 so that the sleeve clamp 14 can be raised or lowered by actuation of the cylinder 15. The sleeve clamp 14 is provided at its a side with a guide post 17 having an upper head. An arm 16 is slidably inserted on guide post 17 through a sliding hole thereof and a compression spring 18 is interposed between the head of guide post 17 and the arm 16.

An operating plate 20 is longitudinally positioned on the multitray 2 and under the free end of the arm 16 and raised or lowered by a cylinder 19. When the operating plate 20 is raised the arm 16 to the top dead point of thereof, the operating plate 20 is spaced from the cam follower 7, which is not raised, by about 1 mm. With the spacing, although when the operating plate 20 is raised to the top dead point, the operating plate 20 does not come into contact with the cam follower 7 so that the stopper pin 4 fixed to the cam follower 7 is not raised, thereby preventing the devices 3 on any track, at which the cam follower 7 not raised is positioned, from being released.

Operation of the apparatus for unloading devices in handler according to the present invention will be now described with reference to FIGS. 3 to 6.

First, when the cylinder 15 mounted on the sliding block 12 is extended so that an empty sleeve 13 can be inserted between the sliding block 12 and the sleeve clamp 14, an empty sleeve 13 is supplied between the sliding block 12 and the sleeve clamp 14 by a device supplying device. At this time, the cylinder 15 is acutuated by a sensor (not shown) so that the empty sleeve 13 is gripped by the sleeve clamp 14.

Thereafter, devices 3 tested from a tester are sequentially transferred onto tracks of the multitray 3. The transferred devices 3 are blocked by the stopper pin 4 to stop the movement of the devices 3 on the track. At this time, a separate sensor senses the transferred devices 3 so that the sliding block 12 is moved to the track by the sensor.

Figure 5:
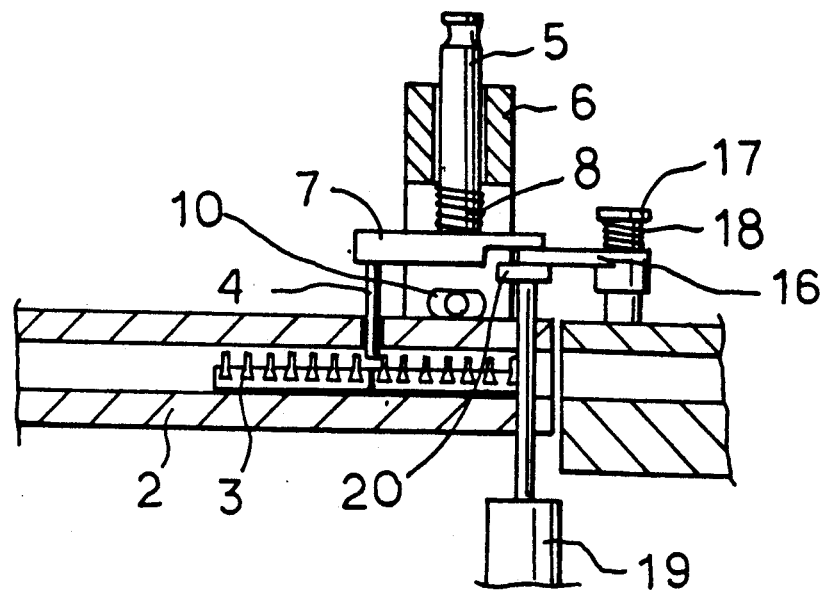
FIG. 5 is an enlarged view similar to FIG. 4, with one stopper pin raised by an operating plate.

FIG. 5 illustrates that any one stopper pin is raised by the operating plate. As shown in the drawing, when the operating plate 20 is raised by actuation of the cylinder 19, the arm 16 comes into contact with the rising operating plate 20 and is raised along the guide post 17 against the compression spring 18, thereby causing the follower 7 positioned at the arm 16 to be raised.

Therefore, the stopper pin 4 mounted on the cam follower 7 is also raised to release the blocked devices 3 so that the devices 3 slides on the track inclined to a ground surface in a direction of arrow (rightwards in the drawing) and are filled into the empty sleeve 13.

If described in detail, since the operating plate 20 which is raised to its top dead point is spaced from the cam follower 7 not raised by about 1 mm so that the operating plate 20 does not come into contact with the cam follower 7. Accordingly, the stopper pin 4 of the follower 7 not raised blocks rightward movement of the devices 3 on the track.

After the empty sleeve 13 has been completely filled with the devices 3, the cylinder 19 is retracted so that the stopper pin 4 and the arm 16 are returned to their original states by restoring force of the compression spring 8 interposed between the bush housing 6 and cam follower 7 and restoring force of the spring 18 inserted on the guide post 17, respectively.

When the empty sleeve 13 is filled with the devices 3, as mentioned above, the sliding block 12 is moved to a certain storage box according to testing result of the devices 3 and then the sleeve clamp 14 releases the sleeve 14 thereby allowing the sleeve 13 to fall into the storage box.

Operation of the apparatus for unloading devices in handler according to the invention is described with regard to any one track. Similarly, the sliding block 12 is repeatedly moved to other tracks to unload devices on the other tracks.

Figure 6:
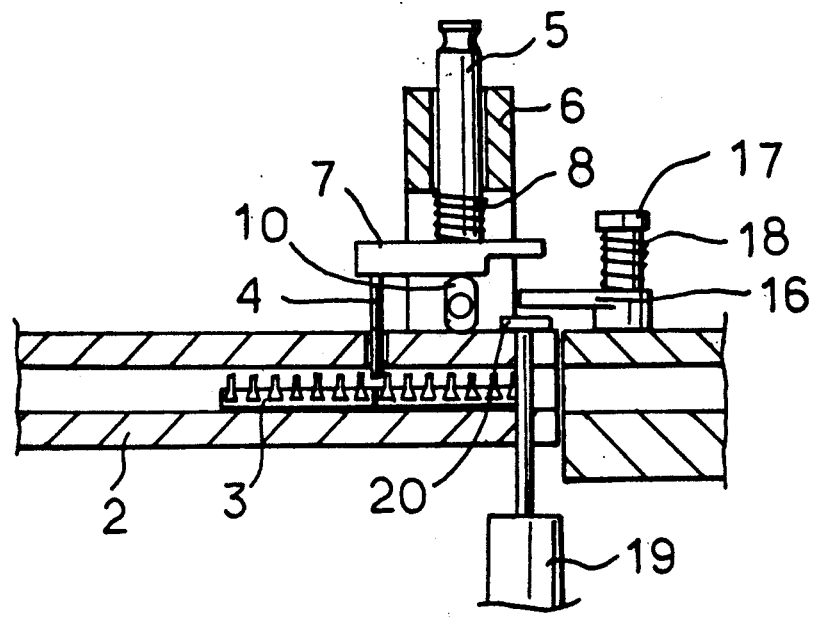
FIG. 6 is a view similar to FIG. 5, with all cam follower raised by a cam.

FIG. 6 illustrates that all followers are raised by rotation of the cam. After the operation described above is completed, there is required to remove all devices on the tracks. At this time, the lever 9 mounted on a side of the bush housing 6 is manually pulled by an operator, as shown in FIG. 3. Upon pulling the lever 9, the cam 10 interposed between the multitray 2 and the cam follower 7 is rotated to raise all of the cam followers 7, thereby enabling presence of the devices 3 on the tracks of the multitray 2 to be confirmed.

As apparent from the above description, the apparatus for unloading devices in handler according to the invention can selectively actuate a plurality of stopper pins by only one output signal without a plurality of expensive solenoids, thereby causing operation efficiency to be improved and manufacturing cost to be decreased.

Although the preferred embodiments of the invention have been disclosed for illustrative purpose, those skilled in the art will appreciate that various modifications, additions and substitutions are possible, without departing from the scope and spirlt of the invention as disclosed in the accompanying claims.

What is claimed is:

1. An apparatus for automatically unloading devices in handler which fills empty sleeves with tested devices and unloads the sleeves, said apparatus comprising:

a multitray having a plurality of tracks which is positioned above a guide shaft of the handler;

a plurality of followers, each having a stopper pin for blocking and releasing devices on the tracks, which are mounted on the corresponding tracks respectively;

an arm mounted on a slide block slidably mounted on the guide shaft which comes into contact with one of the followers selectively; and an operating plate for raising and lowering the arm and one of the followers by actuation of a cylinder.

2. An apparatus according to claim 1, in which a cam is interposed between the multitray and the followers and connected to a lever so that all the followers are simultaneously raised by pivoting motion of the lever.

3. An apparatus according to claim 2, in which said cam has opposite cut surfaces at the outer circumferential surface thereof.

4. An apparatus according to claim 1, in which said arm is inserted on a guide post fixed to the slide block so as to be slidable upwardly and downwardly and a compression spring is interposed between the head of guide post and the arm to bias the arm downwardly.

* * * * *